(12) United States Patent
Bousquet et al.

(10) Patent No.: US 9,754,498 B2
(45) Date of Patent: Sep. 5, 2017

(54) FOLLOW-ME SYSTEM FOR UNMANNED AIRCRAFT VEHICLES

(71) Applicant: Airbus Defence and Space GmbH, Munich (DE)

(72) Inventors: Joy Bousquet, Gaimersheim (DE); Thomas Vitte, Pfaffenhofen an der Ilm (DE)

(73) Assignee: Airbus Defence and Space GmbH, Munich (DE)

( * ) Notice: Subject to any disclaimer, the term of this patent is extended or adjusted under 35 U.S.C. 154(b) by 0 days.

(21) Appl. No.: 14/846,602

(22) Filed: Sep. 4, 2015

(65) Prior Publication Data

US 2016/0071421 A1    Mar. 10, 2016

(30) Foreign Application Priority Data

Sep. 5, 2014    (EP) .................................. 14290265

(51) Int. Cl.
*G08G 5/00*    (2006.01)
*G05D 1/10*    (2006.01)

(52) U.S. Cl.
CPC .......... *G08G 5/0047* (2013.01); *G05D 1/104* (2013.01); *G08G 5/0008* (2013.01); *G08G 5/0052* (2013.01); *G08G 5/0056* (2013.01)

(58) Field of Classification Search
CPC .. G08G 5/0047; G08G 5/0008; G08G 5/0052; G08G 5/0056; G05D 1/104
USPC ....................................................... 701/467
See application file for complete search history.

(56) References Cited

U.S. PATENT DOCUMENTS

| 7,272,472 B1 | 9/2007 | McElreath |
| 2005/0230563 A1* | 10/2005 | Corcoran, III ......... G05D 1/104 244/175 |
| 2009/0030566 A1 | 1/2009 | Bodin et al. |
| 2009/0319101 A1* | 12/2009 | Coulmeau ............ G08G 5/0008 701/7 |

FOREIGN PATENT DOCUMENTS

CA    2 836 870 A1    11/2012

OTHER PUBLICATIONS

Extended European Search Report dated Mar. 6, 2015 (Six (6) pages).

* cited by examiner

*Primary Examiner* — Brian P Sweeney
(74) *Attorney, Agent, or Firm* — Crowell & Moring LLP

(57) ABSTRACT

A system for navigating an aircraft includes a first aircraft with a first communication unit and a second aircraft with a second communication unit. The first aircraft is adapted for determining coordinates of a position of a waypoint. The first communication unit is adapted to transmit the coordinates of the position of the waypoint to the second communication unit. The second aircraft is adapted to navigate to the position of the waypoint. Several waypoints can be provided in this manner such that a flight trajectory is established along which the second aircraft may follow the first aircraft. In addition, the second aircraft may be adapted to follow the first aircraft based on a received identification signal. In certain embodiments, the system can be used such that the second aircraft can follow the first aircraft in case of a failure of systems of the second aircraft.

13 Claims, 4 Drawing Sheets

FOLLOW-ME SYSTEM FOR UNMANNED AIRCRAFT VEHICLES

CROSS REFERENCE TO RELATED APPLICATIONS

This application claims priority under 35 U.S.C. §119 from European Patent Application No. 14290265.9, filed Sep. 5, 2014, the entire disclosure of which is herein expressly incorporated by reference.

FIELD OF THE INVENTION

The invention generally relates to aircraft navigation systems. In particular, the invention relates to a system for navigating an aircraft and a method for navigating an aircraft.

BACKGROUND OF THE INVENTION

Nowadays, unmanned aircraft systems (UAS) are remotely controlled from ground stations. Therefore, a remote pilot on the ground controls flight maneuvers for the unmanned aircraft system. It is possible that there is also a communication between the remote pilot on the ground and an air traffic control (ATC), but this communication often depends on the data link availability. Due to this aspect and to other certain requirements, unmanned aircraft systems are not allowed to fly within certain air spaces, such as civil air spaces. Therefore, the airspaces in which unmanned aircraft are allowed to fly are limited in most cases. Airspaces in which unmanned aircraft are allowed to fly are limited to military segregated airspaces or other airspaces where there is no operation of civil aircraft. Therefore, the use of unmanned aircraft, especially in Europe, is extremely difficult and not flexible. In most cases, governmental regulations restrict the usage of unmanned aircraft systems in certain airspaces.

CA 2836870 (A1) describes a method and a system for steering an unmanned aerial vehicle (UAV). The flight plan of the unmanned aerial vehicle is based on the trajectory of the target it has to track. Therefore, different sensors are integrated in the unmanned aerial vehicle which sensors are adapted to calculate the trajectory of the unmanned aerial vehicle.

US 2009/030566 (A1) describes the navigation of unmanned aerial vehicles in a formation. A navigation algorithm for controlling a formation flight of unmanned aerial vehicles is described.

SUMMARY OF INVENTION

It is an object of the present invention to provide an enhanced navigation system for aircraft.

This object is achieved by the subject-matter of the independent claims. Further exemplary embodiments are evident from the dependent claims and the following description.

According to a first aspect of the present invention, a system for navigating an aircraft is described. The system comprises a first aircraft with a first communication unit and a second aircraft with a second communication unit. The first aircraft is adapted to determine coordinates of a position of a waypoint. The first communication unit which may be integrated in the first aircraft is adapted to transmit the coordinates of the position of the waypoint to the second communication unit. The second aircraft is adapted to navigate to the position of the waypoint.

By means of the first communication unit and the second communication unit, the contact between the first aircraft and the second aircraft may be established. The coordinates of the position of the waypoint may describe a distinct point in the airspace. Therefore, spatial coordinates may be determined with respect to different reference systems by a first computing element which may also be integrated in the first aircraft. The first aircraft may further comprise a radar which may work in an active or passive mode and a pilot display. The pilot display may provide information for the pilot like for example operational flight data of the first aircraft and the second aircraft. The reference system in which the coordinates of the position of the waypoint are defined may be a world geodetic system 1984 (WGS 84) which is an earth centered earth fixed system, an inertial system and/or an aircraft coordinate system. The first communication unit and the second communication unit may be bidirectional communication systems. With a bidirectional communication system it is possible to both receive and to transmit or send data. For example, the first computing element of the first aircraft determines the coordinates of the position of a waypoint which is a distinct point in the airspace and transmits these coordinates of the position of the waypoint via the first communication unit to the second communication unit and hence to the second aircraft. A second computing element in the second aircraft may process the coordinates of the position of the waypoint after they have been received by the second communication unit. After processing the coordinates of the position of the waypoint, the second aircraft may automatically navigate to the position of this waypoint. It is possible that the waypoint is a point in the airspace through which the first aircraft flew at a certain point in time. In other words, the first aircraft flies through a distinct point in the airspace, determines the coordinates of the position of that distinct point which is called waypoint and then transmits the coordinates of this waypoint such that the second aircraft may navigate to this waypoint in order to fly through this waypoint as the first aircraft did at an earlier point in time. Hence, this flight maneuver can be called a follow-me process. In this flight maneuver, the first aircraft may comprise a leader segment and the second aircraft may comprise a follower segment. The first aircraft can be physically located in front of the second aircraft with respect to the flight direction. The first aircraft may also be above, below or behind the second aircraft or anywhere else during the follow-me process. In other words, it may not be necessary that the second aircraft navigates to a waypoint through which the first aircraft flew. The waypoint to which the second aircraft navigates may therefore be determined by a spatial translation of another determined waypoint through which the first aircraft flew. However, both first aircraft and second aircraft may fly at a predetermined distance to each other when the second aircraft follows the first aircraft. It is possible that in addition to the coordinates of the position of the waypoint a time value for this waypoint is determined by the first computing element of the first aircraft. For example, this time value may be the point in time when the first aircraft flies through the waypoint. As the waypoint may comprise three spatial coordinates describing the position of the waypoint and a time value, this waypoint can also be characterized as a 4-D waypoint (four-dimensional waypoint). The first aircraft may be adapted to determine coordinates of positions of several waypoints. Each of the waypoints is then defined by three spatial coordinates and one time value. In this manner, a speed information of the first aircraft can be obtained from at least two different waypoints which are flown through by the first aircraft. This speed information of the first aircraft can be transmitted to the second aircraft which can then adapt its speed to the speed of the first aircraft. However, it is possible that the first aircraft adapts its speed to the speed of the second aircraft and therefore also to the capabilities of the second aircraft. This is due to the fact that the speed of the second aircraft depends on its flight capabilities, e. g. flight envelope. In other words, the second aircraft may be driven by a 4-D flight plan which is defined by several 4-D waypoints. The first aircraft may be an aircraft with a fixed wing or a rotary wing. The first aircraft may further be a civil aircraft or a military aircraft like for example a tactical aircraft, a transport aircraft or a fighter jet. The second aircraft may be an unmanned aerial vehicle (UAV), an unmanned aircraft system (UAS) or a remotely piloted aircraft system (RPAS). It is also possible that the second aircraft is a manned aircraft. However, the first aircraft is adapted to determine coordinates of a position of a waypoint or coordinates of positions of several waypoints and to transmit these coordinates to the second aircraft. The first aircraft may also be adapted to receive information from the second aircraft like for example information about the position, the orientation and/or the speed of the second aircraft. The second aircraft however may be adapted to navigate to the position of the waypoint or to the positions of the several waypoints in order to follow the first aircraft.

This provides the opportunity to fulfill the requirements that an unmanned aircraft system may operate beyond the segregated military airspaces. This is due to the fact that an unmanned aircraft system, which is controlled from the ground, can be recovered in an emergency scenario. An emergency scenario may be a loss of the data link between the unmanned aircraft system and the remote pilot on ground or a navigation failure which results in an uncontrolled flight of the unmanned aircraft system. Since the unmanned aircraft system can automatically follow the manned aircraft by means of the determined waypoints, it is possible that the manned aircraft operates as a leader aircraft guiding the unmanned aircraft such that the unmanned aircraft leaves an airspace in which it is not allowed to fly or in an emergency scenario requiring an emergency landing. The described navigation system for aircraft may be applied to all aircraft which are not allowed to fly within certain airspaces, for example aircraft without navigation and surveillance systems like Mode S Transponder or Traffic Alert and Collision Avoidance Systems. The unmanned aircraft system may thus be integrated in all airspaces, like for example civil airspaces and hence is not limited to segregated military airspaces. This may also provide the opportunity to let unmanned aircraft systems fly within non-controlled airspaces with non-cooperative aircraft, like for example E, F and G airspaces. Another advantage is that the main part of the payload is installed on the first aircraft whereas no or only minor modifications of existing unmanned aircraft systems are required.

According to another aspect of the invention a system for navigating an aircraft is described. The system comprises a first aircraft with a first communication unit and a second aircraft with a second communication unit. The first aircraft is adapted to transmit an identification signal to the second aircraft. The second aircraft adapted to follow the first aircraft after receipt of the identification signal. The identification signal may be a beacon signal.

Thus, the second aircraft may comprise a radar system which is adapted to receive the identification signal sent from or emitted by the first aircraft in order to verify the identity of the first aircraft. The identification signal may be sent from or emitted by the first communication unit of the first aircraft. After verifying the identity of the first aircraft, the second aircraft follows the first aircraft, for example in an emergency scenario. The radar system may be a part of the second communication unit but it may also be physically separated from and connected to the second communication unit such that both second communication unit and radar system are integrated within the second aircraft. However, the second aircraft may follow the first aircraft based on its own radar system so that a determination of waypoints by the first aircraft is not necessary to navigate the second aircraft to a predetermined location. The second aircraft may comprise a tracking function which determines the current position of the first aircraft by means of the identification signal. The radar system of the second aircraft may for instance determine an angular location or position of the first aircraft in a passive mode by tracking the identification signal. The radar system may also be adapted to conduct the angular localization of the first aircraft in by means of a skin echo which is reflected at the first aircraft and which can then be received by the radar system of the second aircraft in an active mode. However, the active mode of the radar, e. g. using a skin echo, may be applied to determine a range or distance between the first aircraft and the second aircraft. The determination of the location of the first aircraft and a future flight path or flight trajectory of the second aircraft may be determined by a computing element of the second aircraft.

According to an embodiment of the invention, the first aircraft is a manned aircraft. The first aircraft may therefore be operated by a pilot who navigates the first aircraft in order to set the waypoints which are determined by the first computing element.

According to another embodiment of the invention, the second aircraft is an unmanned aircraft. The second aircraft may be an unmanned aerial vehicle, an unmanned aircraft system or a remotely piloted aircraft system. The second aircraft may be a military aircraft which is adapted to be operated by a remote pilot on the ground. Therefore, the second aircraft provides a communication link to a communication unit on the ground. The second aircraft may comprise a second computing element which receives information from the ground communication unit via the second communication unit in order to navigate the second aircraft. The second computing element of the second aircraft may also receive such information from the first communication unit of the first aircraft. This information at least comprises the coordinates of a position of a waypoint. In a preferred embodiment, this information comprises coordinates of the positions of several waypoints. Since these waypoints may describe a flight path of the first aircraft, the second computing element of the second aircraft may navigate the second aircraft in order to follow the first aircraft.

According to another embodiment of the invention, the first aircraft is adapted to determine coordinates of positions of a plurality of waypoints which waypoints are determined with respect to a reference system. Therein, each of the plurality of waypoints together defines a flight trajectory of the first aircraft.

The relative distance between each of the waypoints may be the same. But it may also be possible that the relative distance between each of the waypoints changes. The flight trajectory of the first aircraft may be described by an arbitrary number of waypoints. The accuracy with which the flight trajectory of the first aircraft is described is the higher the more waypoints are used to define the flight trajectory of the first aircraft. However, the flight trajectory may be the path along which the second aircraft flies when it is navigated from waypoint to waypoint. The reference system may be a WGS 84 system, an aircraft coordinate system or an inertial system.

According to another embodiment of the invention, the first aircraft is adapted to determine a time value for each of the plurality of waypoints.

In this manner, the first aircraft, e.g. the first computing element of the first aircraft, determines four dimensions describing the position of a waypoint at a distinct point in time. Knowing the time at which the first aircraft flew through the different waypoints, it is possible to determine the speed of the first aircraft. As the coordinates of the positions of the several waypoints with the appropriate time values are transmitted to the second communication unit, the second computing element of the second aircraft may process this data in order to navigate to the positions of the several waypoints and to adapt the speed of the second aircraft to the speed of the first aircraft. In most cases, however, the speed of the first aircraft may is adapted to the speed of the second aircraft which may be necessary if the capabilities or the performance of the second aircraft is limited.

According to yet another embodiment of the invention, the second aircraft is adapted to follow the flight trajectory of the first aircraft during flight operation of the first aircraft and the second aircraft.

Thus, it is possible to navigate the second aircraft if the data link or a communication to the ground pilot is interrupted or lost during flight operation of the second aircraft. The first aircraft may also be in flight operation when navigating the second aircraft to the determined waypoints. Since the distance between the first aircraft and the second aircraft can be arbitrarily adapted during flight operation of both aircraft, it is possible to use data links or communication means between the first aircraft and the second aircraft which are limited to short distance communication. In other words, communication means with a maximum range can be used because the first aircraft may approach the second aircraft until both aircraft are close enough that a selected communication means works properly.

According to another embodiment of the invention, the first aircraft further comprises a first processing unit. The first processing unit may comprise a computing element, e.g. the first computing element. The first processing unit is adapted to determine a position of the second aircraft based on a signal sent from the second communication unit to the first communication unit.

The position of the second aircraft may be determined with respect to any coordinate or reference system, like for example a WGS 84, inertial systems or aircraft systems. The signal sent from the second communication unit may be received by an antenna for example. Therefore, the first communication unit may comprise a radar which is able to operate in an active and/or passive mode. The radar may comprise an electronically steerable antenna. The radar of the first aircraft may receive information from the second aircraft. Hence, the radar of the first aircraft may be adapted to cover a certain angular sector in rearward direction of the first aircraft. The orientation of the radar may for instance be adjusted within 50 degrees in a vertical and/or horizontal direction. The radar may therefore be rotatably mounted in the first aircraft.

According to yet another embodiment of the invention, the signal is an encoded signal. The first processing unit of the first aircraft is adapted to decode the encoded signal sent from the second communication unit to the first communication unit.

Encoding the signal may prevent delivering information of the second aircraft, e.g. the unmanned aircraft, to unauthorized access. In other words, the first aircraft at first has to verify its identity before starting the communication with the second aircraft. After verifying the identity of the first aircraft, the first communication unit may receive the signal sent from the second communication unit of the second aircraft, which signal may comprise information about the position of the second aircraft. It is also possible that after verification, the first communication unit requests the identity of the second aircraft such that it can be ensured that it is the right aircraft the first aircraft is tracking or communicating with.

Providing an encoded signal requires encryption codes which are necessary to establish the link between the first aircraft and the second aircraft. The encryption codes may be security relevant and may require the establishment of a specific process in order to provide the delivery of information between the first aircraft and the second aircraft.

According to another embodiment of the invention, the first processing unit is adapted to determine operating data of the second aircraft, which is selected from the group comprising speed, altitude and load factor.

With this data, the flight envelope of the second aircraft may be determined. However, the flight envelope may also be known in advance, based on the aircraft type and a possible degradation or performance reduction of the second aircraft transmitted through a health monitoring status which will be explained later. The flight envelope is provided to the pilot of the first aircraft via a pilot display. The pilot of the first aircraft can then adapt the operating data of the first aircraft to the operating data of the second aircraft. In other words, the performance of the first aircraft may be adapted to the performance of the second aircraft, e.g. the unmanned aircraft. The speed of the first aircraft may for instance be adapted to the speed of the second aircraft such that the second aircraft is able to follow the first aircraft. Therefore, it is possible that the pilot of the first aircraft manually adapts the flight characteristics or the operating data of the first aircraft to the flight characteristics or operating data of the second aircraft. It is also possible that this adaption process can be conducted automatically, for example by the first computing element of the first aircraft. Operating data may for instance comprise speed and altitude of an aircraft.

According to yet another embodiment of the invention, the first aircraft further comprises a display wherein the display is adapted to display at least the operating data of the second aircraft.

Therefore, the altitude, the range between the first aircraft and the second aircraft, the speed and the flight envelope of both the first aircraft and the second aircraft may be displayed on the display of the first aircraft. In this manner, the displayed information about the flight characteristics, e.g. the operating data of the first and/or the second aircraft, may help the pilot to adapt the flight characteristics, e.g. operating data, of the first aircraft to the flight characteristics of the second aircraft.

According to another embodiment of the invention, the position of the second aircraft is determined with respect to an Earth reference system. For example, the position of the second aircraft is determined with respect to a WGS 84 system. It may also be possible to determine the position of the second aircraft with respect to an aircraft system or to an inertial system. The position may be determined by means of Cartesian coordinates, spherical coordinates or cylindrical coordinates. However, the second aircraft is localized with a radar in an active and passive mode or as an alternative by any other device for measuring an angular direction and a range. For example, the second aircraft may be localized in a local reference frame, like for example an aircraft system or an inertial system, wherein the local reference systems may be used as an intermediate step in the calculation of the localization. Such intermediate steps may be followed by a final localization of the second aircraft, which final localization is conducted with respect to a global positioning system, like for example a world geodetic system 1984 (WGS 84).

According to another embodiment of the invention, the first communication unit comprises a radar which is adapted to receive a beacon signal sent from the second communication unit in a passive mode such that an angular position of the second aircraft with respect to the first aircraft can be determined.

The first communication unit and the radar may also be separate components which can be connected to each other or to the first computing element; e. g. the radar is spatially separated from the first communication unit. The radar may be rotatably arranged within the first aircraft such that a signal from the second aircraft can be received by the radar. The radar may be a part of the first communication unit of the first aircraft. To receive the signal from the second communication unit, the radar which is rotatably mounted within the first aircraft can be directed into different directions. In the passive mode, the radar detects and tracks a cooperative signal, for example a beacon signal, sent by the second aircraft in order to determine an angular direction of the second aircraft relative to the first aircraft. A cooperative signal is intentionally sent by the aircraft to be tracked, e. g. the second aircraft. An angular position of the second aircraft with respect to the first aircraft may be defined by the position of the second aircraft with respect to an aircraft coordinate system of the first aircraft. The angular position of the second aircraft with respect to the first aircraft can also be determined with respect to an Earth reference system, e. g. a WGS 84. The angular position or location of the second aircraft may also be determined by a skin echo instead of tracking the beacon signal. Therefore, the radar may work in an active mode.

According to yet another embodiment of the invention, the first communication unit comprises a radar which is adapted to receive a signal sent from the second communication unit or reflected at the second aircraft in an active mode such that a range between the first aircraft and the second aircraft can be determined. The signal received by the radar in an active mode may be a skin echo. When the second aircraft is illuminated by the radar of the first aircraft in an active mode, the skin echo of the second aircraft may be a non-cooperative signal. The skin echo may a signal which is reflected back from the second aircraft to the first aircraft.

The range describes the distance between the first aircraft and the second aircraft. By means of both range and angular direction of the second aircraft relative to the first aircraft, a localization of the second aircraft may be conducted. Hence, the current position of the second aircraft which is following the first aircraft can be determined during flight operation of both aircraft. The skin echo may be a signal which starts at the radar of the first aircraft, travels to the second aircraft where it is reflected and then travels back to the radar of the first aircraft. The travelling time of the signal can be determined in order to calculate the distance between the first aircraft and the second aircraft. The signal may be reflected on the outer skin of the second aircraft for example. However, the skin echo may also be used to determine an angular location of the second aircraft when the radar works in an active mode. In the same manner, it may possible that the second aircraft can determine the angular position or location of the first aircraft by means of a skin echo. Therefore, the second aircraft may be capable of emitting a signal which is reflected on the surface of the first aircraft and then returns as a skin echo to the second aircraft such that an angular position of the first aircraft can be determined with respect to the second aircraft, for example by means of a radar being integrated within the second aircraft. In other words, a radar for determining both angular location of and range to another aircraft may be integrated on either the first or the second aircraft. Furthermore, any angular location and ranging device may be integrated or installed either on the first or on the second aircraft, like for example electro optical (EO) and/or infrared (IR) systems. Other systems, like for instance light detection and ranging (LIDAR) and/or guidance systems similar to the ones in missile systems may also be applied.

According to another embodiment of the invention, the signal sent from the second communication unit to the first communication unit comprises information about the identity of the second aircraft.

Using a beacon signal which is sent to the first aircraft, e.g. the piloted aircraft, allows using a relatively small antenna of the radar for receiving and tracking the beacon signal. The beacon signal may be strong enough to ensure an accurate monopulse tracking of the second aircraft with the small antenna of the aircraft radar. By means of the beacon signal, different data can be sent to the first aircraft, like for example the current position of the second aircraft or a health monitoring status of the second aircraft. The health monitoring status may comprise information about a failure of systems of the second aircraft which failure reduces the flight performance of the second aircraft. Such a failure may be the result of an inoperative engine for example. Icing may also occur on aircraft systems which reduces the performance of the aircraft.

In another embodiment the first aircraft may send the beacon signal to the second aircraft and the second aircraft is equipped with a tracking system such that the second aircraft tracks the first aircraft by means of the beacon signal sent from the first communication unit to the second communication unit.

It should be understood that both angular direction and distance are determined in order to localize the second aircraft relative to the first aircraft. The localization requires two different radar modes. The angular direction of the second aircraft relative to the first aircraft may be determined in a passive mode of the radar which radar tracks the powerful beacon signal with a monopulse tracking mode. The distance of the second aircraft to the first aircraft is determined in an active mode of the radar such that the distance is determined by measuring the time a signal or skin echo starting from the first aircraft needs to travel to the second aircraft and back from the second aircraft to the first aircraft. The signal may be reflected at the outer skin of the second aircraft such that the signal can be called skin echo. The skin echo may be received by the first communication unit, e. g. the radar, after it has been reflected at the outer skin of the second aircraft.

Other angular location and ranging devices, with which the position and orientation of other aircraft can be determined, may be alternatively integrated into the first aircraft and/or into the second aircraft. Such devices may use electro optical (EO) and/or infrared (IR) systems. Other systems, like for instance light detection and ranging (LIDAR) and/or guidance systems similar to the ones in missile systems may be applied. Such systems may for instance be used instead of or alternatively to a radar working in a passive and active mode.

According to another aspect of the invention, a method for navigating an aircraft comprising different steps is described. In a step of the method, coordinates of a position of a waypoint are determined by a first aircraft. In another step of the method, the coordinates of the position of the waypoint are transmitted from a first communication unit of the first aircraft to a second communication unit of a second aircraft. In another step of the method, the second aircraft navigates to the position of the waypoint. Navigating the second aircraft to the position of the waypoint may be based on the transmitted coordinates of the position of the waypoint which were determined by the first aircraft. The method may comprise other steps, like for example the determination of coordinates of a position of a second waypoint by the first aircraft. The coordinates of the position of the second waypoint can then be transmitted from the first communication unit of the first aircraft to the second communication unit of the second aircraft. In another step, the second aircraft is navigated to the position of the second waypoint. The same procedure can be repeated for an arbitrary number of waypoints such that a flight trajectory based on a plurality of waypoints can be provided for the second aircraft. With this method it is possible that the second aircraft can follow the first aircraft, for example in an emergency scenario.

If technically possible but not explicitly mentioned, also combinations of any embodiments of the invention as described in the above and in the following may be embodiments of the system for navigating an aircraft.

These and other aspects of the present invention will be apparent from and elucidated with reference to the embodiments described hereinafter.

DETAILED DESCRIPTION OF THE DRAWINGS

Figure 1:
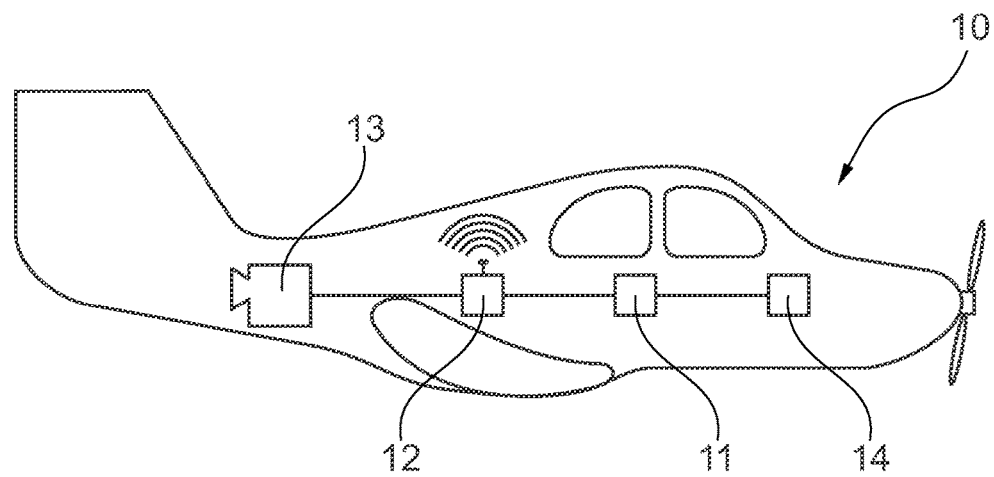
FIG. 1 shows a first aircraft with a first communication unit, a first processing unit, a display and a radar according to an embodiment of the invention.

FIG. 1 shows a first aircraft 10 comprising different components or payloads such as a first processing unit 11, a first communication unit 12, a radar 13 and a display 14. The first communication unit 12 may be a bi-directional communication system which is capable of both sending and receiving data and/or information. These components may be integrated or installed within the first aircraft 10. The first processing unit 11 may comprise a first computing element which is adapted to process received data from other aircraft or from the ground, e. g. air traffic control (ATC). The first aircraft may be a manned or an unmanned aircraft. Preferably, the first aircraft is a manned aircraft, like for instance a transport aircraft, a military aircraft or a helicopter. However, the first aircraft may be a fixed-wing aircraft or a rotary-wing aircraft, e. g. a rotorcraft. The radar 13 of the first aircraft 10 may be a part of the first communication unit 12. The radar 13 comprises an electronically steerable antenna with which the coverage area of the radar 13 may be flexibly adjusted. Therefore, the radar 13 may be arranged such that an area around the back of the first aircraft 10 may be covered. For example, the radar 13 may be rotated in a vertical and/or in a horizontal direction up to 50 degrees. The radar 13 may operate in a passive mode in which a signal sent from another aircraft can be detected and/or tracked. The radar 13 may also operate in an active mode in which the range between the first aircraft 10 and another aircraft may be determined. In this manner, the position of another aircraft relative to the position of the first aircraft 10 may be determined, for example during flight operation. The first communication unit 12, e. g. the radar 13, may be adapted to determine the range between the first aircraft 10 and the other aircraft for relatively short distances, like for instance 500 meters to 2000 meters.

Figure 2:
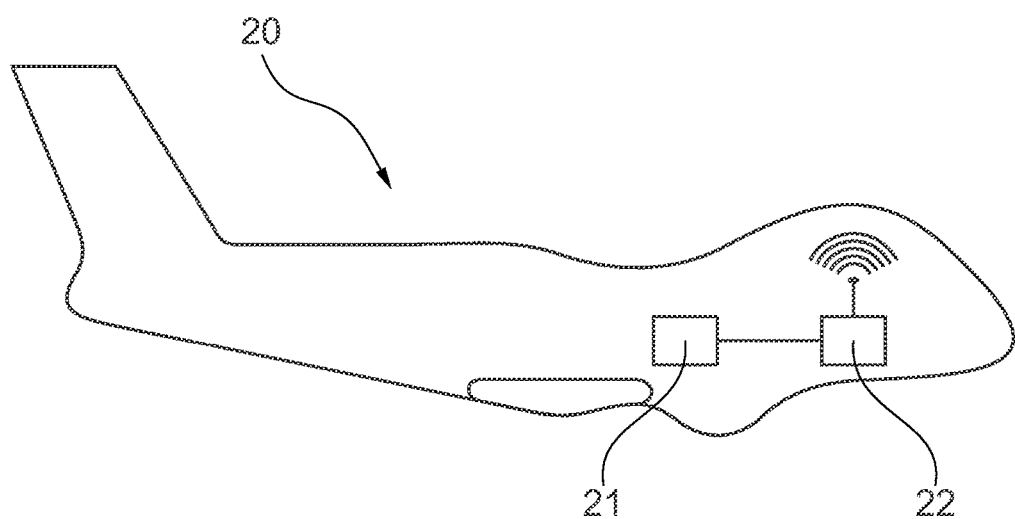
FIG. 2 shows a second aircraft with a second communication unit and a second processing unit according to an embodiment of the invention.

FIG. 2 shows a second aircraft 20 which comprises a second processing unit 21 and a second communication unit 22. The second communication unit 22 may be a bi-directional communication system which is capable of both sending and receiving data and/or information. These components may be integrated or installed within the second aircraft 20. The second communication unit 22 may be adapted to exchange information and/or data with the first communication 12 unit of the first aircraft 10. The second communication unit 22 may send a beacon signal to the first aircraft 10, e. g. the piloted aircraft. This beacon signal may be received by the radar 13 so that the first processing unit 11 is able to determine the angular location of the second aircraft 20 by means of the sent beacon signal. The beacon signal may be strong enough to ensure an accurate monopulse tracking of the second aircraft 20 with the small antenna of the aircraft radar 13. Monopulse tracking means that an angular direction or position of the second aircraft 20 relative to the first aircraft 10, which changes during flight operation, may be determined by a single signal pulse of the beacon signal. The radar 13 may thus be a monopulse radar. However, it may further be possible that data may be send from the second communication unit 22 to the first communication unit 12, e. g. the radar 13, via the beacon signal. By means of the beacon signal and a skin echo the current position of the second aircraft 20 may be calculated and/or determined. Other data sent by the beacon signal may comprise a health monitoring status which for example gives an indication of defects and system failures within the second aircraft 20. The second communication unit 22 may also receive information and/or data from the first communication unit 12 of the first aircraft 10. In this manner it may be possible that the second aircraft 20 navigates or can be navigated to predetermined waypoints on the basis of the received information and/or data.

The position of the waypoints can be determined by the first processing 11 unit of the first aircraft 10. After sending the position information of the waypoints from the first communication 12 unit to the second communication 22 unit, the positions of the waypoints can be analyzed and processed by the second processing unit 21 such that the second aircraft 20 is directed towards and navigated to the determined waypoints. Since the determined waypoints may describe positions in the airspace through which the first aircraft flies 10 and later also the second aircraft 20 flies, the process of navigating the second aircraft 20 to the waypoints set by the first aircraft 10 can be imagined as a follow-me process. A second computing element, which may be a part of the second processing unit 21, may determine or calculate the positions of these waypoints. The positions of the waypoints may therefore be determined by the first processing unit 11, e.g. the first computing element, when the first aircraft 10 is moving during flight operation, the first processing 11 unit may consecutively determine several waypoints which together describe a flight trajectory of the first aircraft 10. In other words, the waypoints are determined one after another. Determining waypoints means that the positions of theses waypoints are calculated. The positions are described by three spatial coordinates and one time value such that 4 dimensions are necessary to distinctly determine one waypoint. The time value may describe the point in time at which the first aircraft 10 passes a certain waypoint and the first processing unit 11 determines the position of this waypoint. The second computing element may send orders to a flight management system and to a flight control system of the second aircraft 20 such that the second aircraft 20 can be automatically navigated to the determined waypoints. The orders may therefore comprise information about the positions of the determined waypoints. The second aircraft 20 may be an unmanned aircraft system and/or a remotely piloted aircraft system.

Before the first communication unit 12 and the second communication unit 22 are allowed to exchange information, the first aircraft 10 may be mandated by either the second aircraft 20 or by an air traffic control which is located on the ground. For example, a registration number of the second aircraft 20 is entered by the pilot of the first aircraft 10 in order to allow a link between the first communication unit 12 and the second communication unit 22. After the registration number of the second aircraft 20 is entered via an interface into the first processing unit 11, an encryption code necessary to establish the link between both communication units 12, 22 and hence both aircraft 10, 20 can be calculated. The encryption code may be security relevant and a specific process may be established for generating and/or delivering the encryption code. Entering the registration number may also provide or reveal information about a flight envelope of the second aircraft 20 such that the flight performance of the first aircraft 10 can be adapted to the flight performance of the second aircraft 20.

Figure 3:
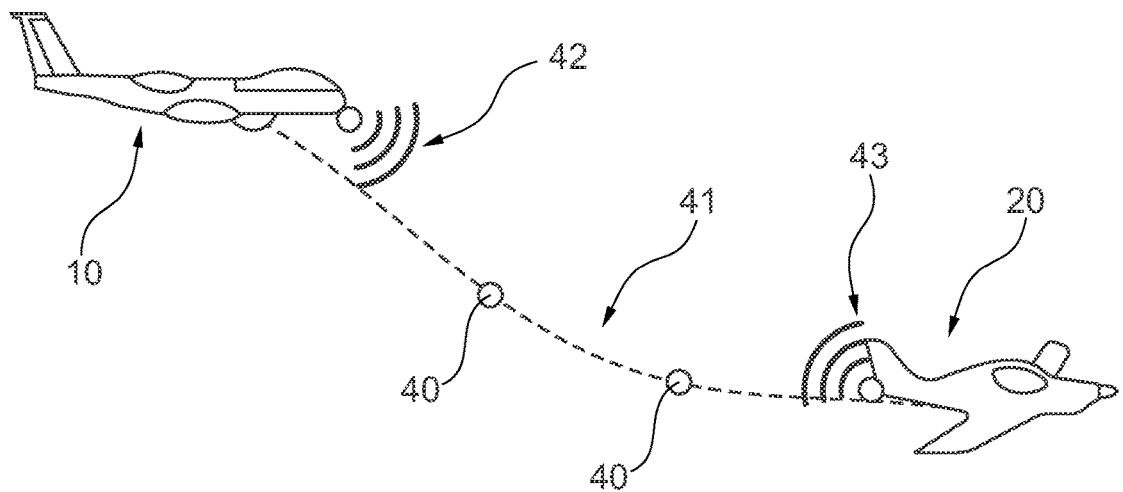
FIG. 3 shows the first aircraft navigating the second aircraft based on determined waypoints according to an embodiment of the invention.

FIG. 3 shows the first aircraft 10 navigating a second aircraft 20 based on determined waypoints 40. As can be seen in FIG. 3, the waypoints 40 define the flight path or flight trajectory 41 of the first aircraft 10. The waypoints 40 and hence the flight trajectory 41 of the first aircraft 10 can thus be followed by the second aircraft 20. The first aircraft 10 may send information about the positions of the determined waypoints 40 by means of a first communication signal 43 to the second aircraft 20. Accordingly, the second aircraft 20 may send information about its position via a second communication signal 42 to the first aircraft 10 to strengthen the reliability of the relative localization calculations. It should be mentioned that the information sent via the communication signals 42, 43 may also comprise other information in addition to the position of the waypoints 40 and the position of the second aircraft 20.

Figure 4:
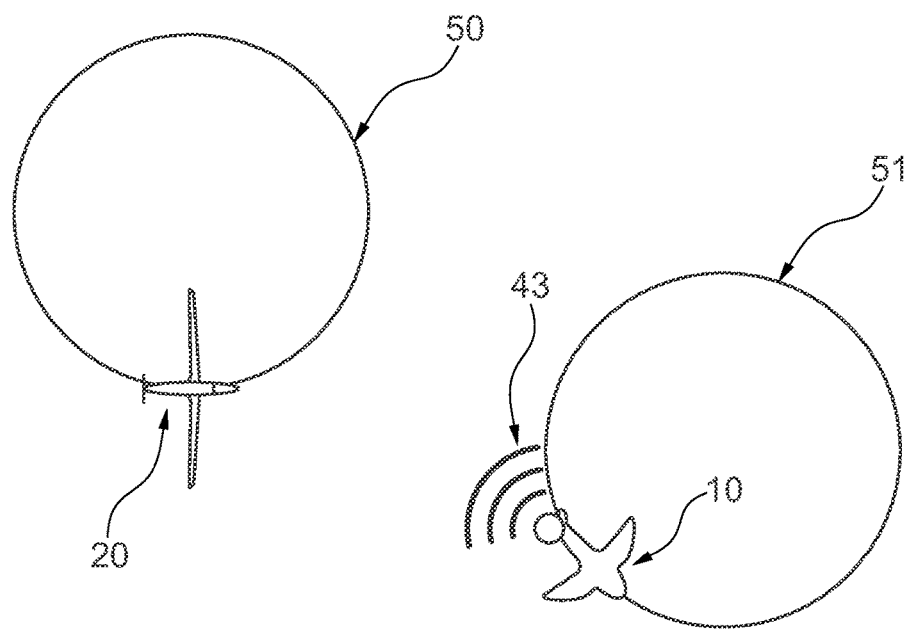
FIG. 4 shows a circular flight path of the first aircraft and the second aircraft according to an embodiment of the invention.

FIG. 4 shows a first step of initializing the follow-me process. Therein, a circular flight path of the first aircraft 10 and the second aircraft 20 can be identified. For example, the second aircraft 20, e. g. the unmanned aircraft system, is loitering at certain location in a known altitude. The loiter 50 may be a circular loiter with a certain radius. Location, altitude and radius of the second aircraft 20 is provided and/or controlled by a remote pilot on the ground or by the air traffic control. The first aircraft 10, e. g. the piloted or manned aircraft, starts another circular loiter 51 at a certain altitude and distance to the second aircraft 20. The altitude and distance may be chosen such that there is no risk of a collision between the first aircraft 10 and the second aircraft 20, for example by predetermining and keeping a minimum distance. A maximum distance between the first aircraft 10 and the second aircraft 20 may also be predetermined in order to ensure a correct signal and information transfer between the first communication 12 unit and the second communication unit 22. The first aircraft 10 may inform the second aircraft 20 via a first communication signal 43 that the follow-me process starts. In other words, the second processing unit 21, e. g. the second computing element, expects the delivery of determined waypoints 40 such that the second processing 21 unit may navigate the second aircraft 20 to the waypoints 40 in order to follow the flight trajectory 41 of the first aircraft 10.

Figure 5:
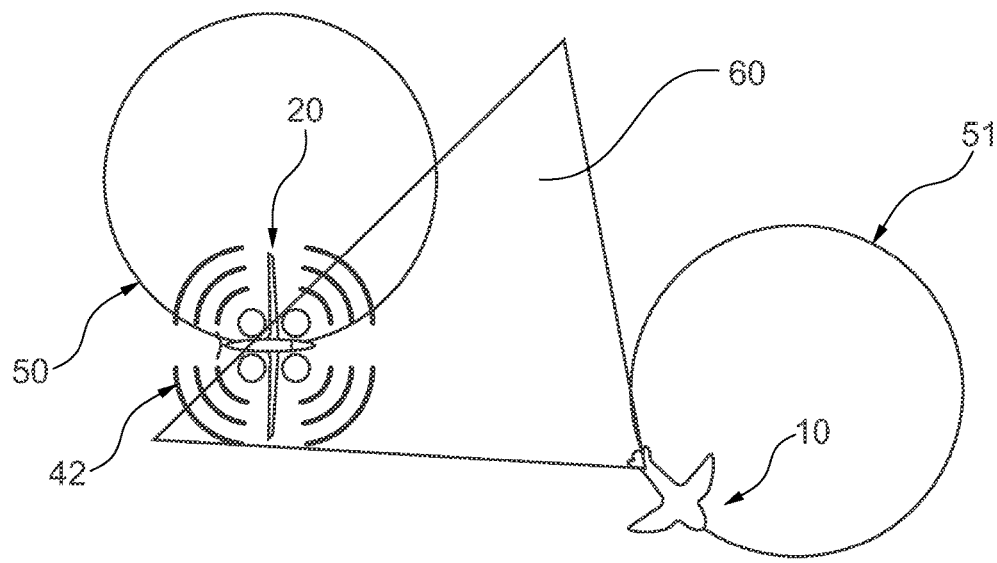
FIG. 5 shows the reception of a communication signal sent from the second aircraft to the first aircraft according to an embodiment of the invention.

FIG. 5 shows a second step of initializing the follow-me process. Therein, the second communication signal 42 from the second aircraft 20 is received by the first aircraft 10. The radar 13 comprises an electronically steerable antenna such that the coverage area 60 of the radar 13 may be flexibly adjusted. The antenna may be adjusted as to cover an area 60 in a rearward direction of the first aircraft 10, wherein the rearward direction is defined as a direction which is substantially opposite to the flight direction of the first aircraft 10, as can be seen in FIG. 5. The radar 13 may be pivotably mounted such that distinct area behind the first aircraft 10 can be covered in a horizontal as well as in a vertical direction. Therein, the horizontal direction may be defined by a constant altitude. The second communication signal 42 sent from second communication unit 22 of the second aircraft 20 may be a beacon signal. The beacon signal may be a coded signal so that, after receiving the beacon signal by the first communication unit 12, the first processing unit 11 is able to ensure that the right aircraft, e. g. the second aircraft 20, is tracked. In other words, the identity of the second aircraft 20 may be verified by a coded signal sent from the second communication unit 22 to the first communication unit 12. The radar 13 may have a monopulse tracking feature integrated which allows the calculation of the angular position of the second aircraft 20 by means of the beacon signal. Therefore, the second aircraft 20 may be located within the coverage area 60 of the radar 13. In an active mode the radar can then calculate the range between the first aircraft 10 and the second aircraft 20 by means of a skin echo which may be a reflected signal from the second aircraft.

Figure 6:
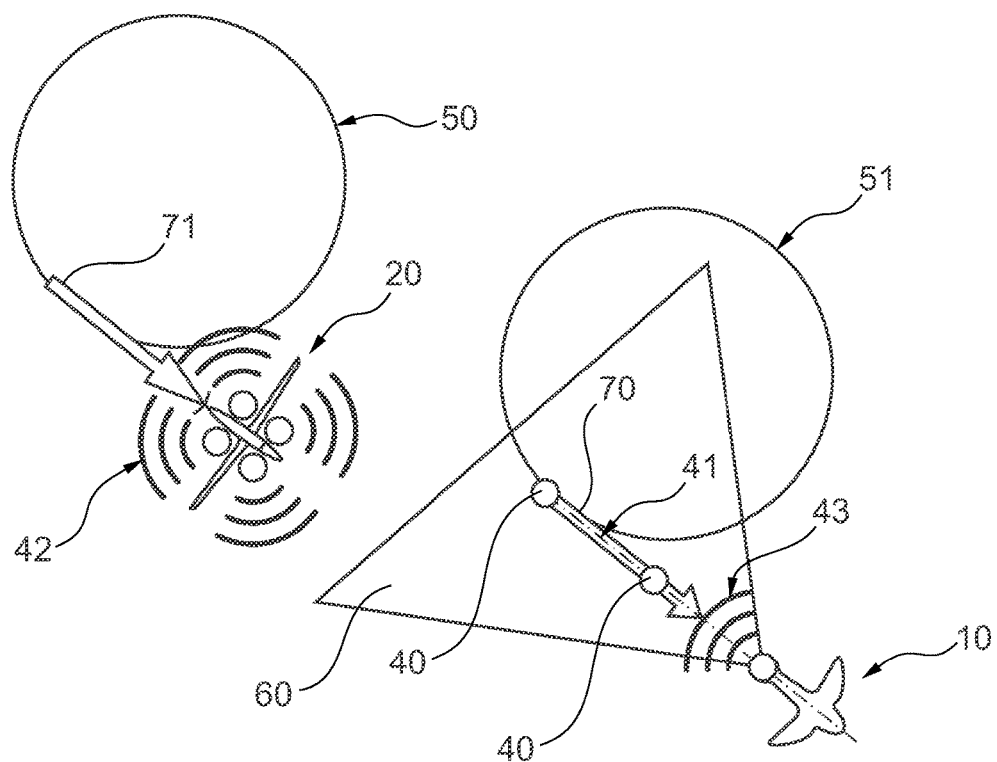
FIG. 6 shows waypoints determined by the first aircraft for navigating the second aircraft according to an embodiment of the invention.

FIG. 6 shows a third step of initializing the follow-me process. Therein, the first processing unit 11 calculates the relative position of the second aircraft 20, e. g. the unmanned aircraft system, by means of the received beacon signal and the active ranging, e. g. the skin echo. Afterwards, the information about the calculated position as well as the determined altitude of the second aircraft 20 is sent from the first communication unit 12 to the second communication unit 22 as to provide this information to the second processing unit 21, e. g. the second computing element. This may be advantageous if the second aircraft 20 is not able to determine its position due to a failure of the navigation system, for example. It may also be possible to synchronize the navigation data of the second aircraft 20 with the navigation data of the first aircraft 10.

The first aircraft 10 may adapt its speed in order to synchronize the phase of the circular loiter 51 of the first aircraft 10 to the phase of the circular loiter 50 of the second aircraft 20. As indicated by a first arrow 70 in FIG. 6, the first aircraft 10 leaves the circular loiter 51, for example tangentially. It may be possible that the first aircraft 10 informs the second aircraft 20 via the communication units 12, 22 that the first aircraft 10 has left the circular loiter 51. The first processing unit 11 further generates information about the determined waypoints 40 which may be located along the flight trajectory 41 of the first aircraft 10. The information about the waypoints, which at least comprises the position and the time value of the waypoint 40, are transmitted from the first communication unit 12 unit to the second communication unit 22 one after another. In arbitrary time intervals, the first processing 11 unit calculates a waypoint 40 which is then provided to the second aircraft 20 for navigation purposes. The time value of a waypoint 40 may be defined by the time when the first aircraft meets this waypoint 40 or flies through this waypoint 40. The time value of a waypoint 40 may also be defined by the time when the first aircraft 10 meets this waypoint 40 including a certain time delay. The time delay is calculated to include safety margins in order to avoid a collision between the first aircraft 10 and the second aircraft 20.

In this manner, the second processing unit 21 may create and update a flight plan comprising four dimensions, e. g. three spatial coordinates describing a distinct point in the airspace and the time value. The flight plan can thus be interpreted as a four-dimensional flight plan or 4-D flight plan. The second processing unit 21 may calibrate the flight characteristics, especially the flight direction of the second aircraft 20 such that the second aircraft 20 follows the first aircraft 10 with a constant time delay. Therefore, the second processing unit 21 provides the updated flight plan to the flight control system or flight management system of the second aircraft 20. The second aircraft 20 thus also leaves its loiter 50 which is indicated by another arrow 71 in FIG. 6.

The first aircraft 10 may be adapted for periodically checking the position of the second aircraft 20, for instance by means of the beacon signal sent from the second communication unit 22 and a signal or skin echo travelling from the first aircraft to the second aircraft and then back to the first aircraft. The beacon signal is received by the radar 13 in a passive mode such that an angular direction of the second aircraft relative to the first aircraft may be determined. The ranging is determined by the radar in an active mode, for example by measuring the travelling time of the signal or skin echo. In other words, a signal is sent from the first communication unit 21 to the second aircraft 20 where the signal is reflected, for example on the outer skin of the second aircraft 20. After reflection, the signal is transmitted back as a skin echo to the first communication unit 21, e. g. the radar. The time span between sending and receiving the signal at the first communication unit 21 may indicate the distance between the first aircraft 10 and the second aircraft 20.

In addition, the updated information about the position of the second aircraft 20 can be transmitted to the second aircraft 20 via the communication units 12, 22. In case there is no failure in the navigation or positioning system of the second aircraft 20, it is also possible that the second aircraft 20 may independently calculate its position and then transmits the information about its position to the first aircraft 10 via the communication units 12, 22. In this manner, the reliability of the position control can be enhanced. The current position of the second aircraft 20 may be displayed on the display 14 of the first aircraft 10 so that the pilot of the first aircraft 10 can permanently check the current position of the second aircraft 20 and therefore also if the second aircraft 20 follows the first aircraft 10 correctly. The display 14 of the first aircraft 10 may be a pilot control screen for example.

In case of a failure or malfunction that reduces the flight performance of the second aircraft 20, which for instance occurs as a result of an inoperative engine or icing of aircraft systems, a health monitoring code may be sent to the first aircraft via the communication units 12, 22. The health monitoring code may comprise information about the limitation of the flight performance of the second aircraft 20 due to the failure. This information may be displayed on the pilot's control screen of the first aircraft 10 so that the pilot can then adapt the flight performance to the limited flight performance and hence to the current flight envelope of the second aircraft 20.

Figure 7:
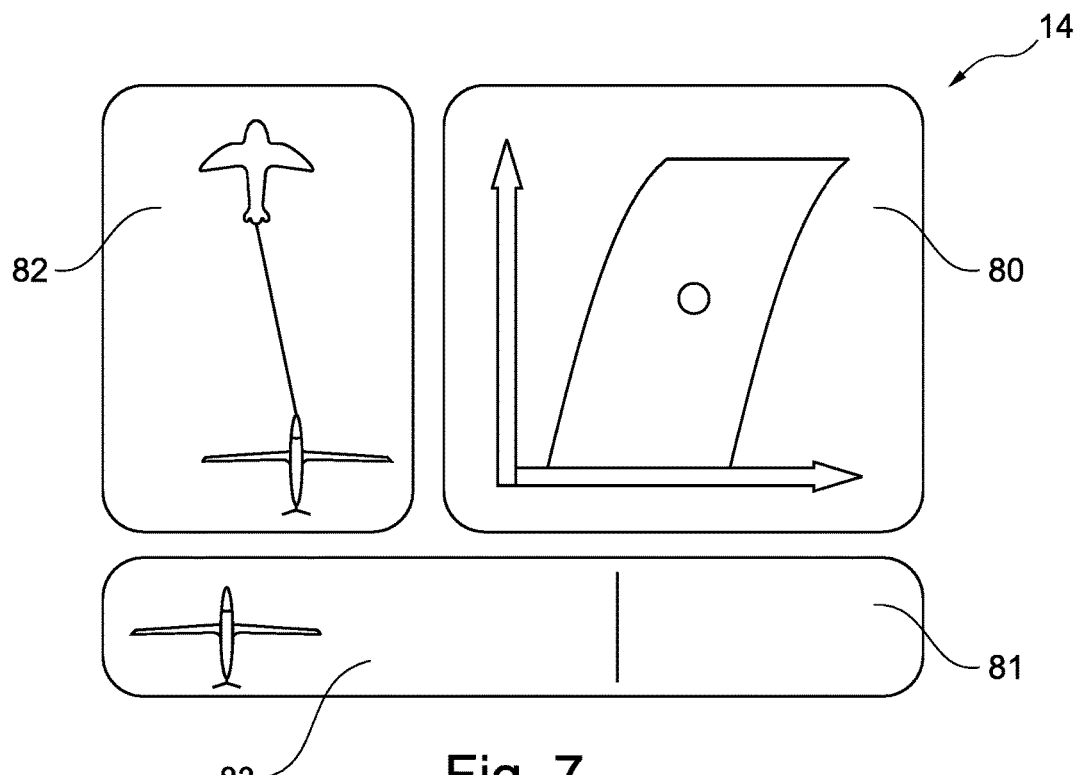
FIG. 7 shows a display of the first aircraft showing information about operating data of the first aircraft and the second aircraft according to an embodiment of the invention.

FIG. 7 shows the display 14 of the first aircraft 10 displaying information about operating data of the first aircraft 10 and the second aircraft 20. The display 14 may be split into different parts, each of the parts indicating certain information about the first aircraft 10 and/or the second aircraft 20. For example, in a first part 80 of the display 14, the flight envelope indicating the current achievable performance, e. g. altitude and speed, of the second aircraft 20 is displayed. In a second part 81 of the display 14, a malfunction source of the second aircraft 20 may be displayed. In a third part 83 of the display 14, information about the correctness of the towing or following procedure can be displayed, i.e. it can be indicated whether the second aircraft 20 navigates to the waypoints 40 and hence correctly follows the first aircraft 10. In a fourth part 82 of the display 14 the range between the first aircraft 10 and the second aircraft 20 may be displayed indicating a possible risk of collision.

It should be mentioned that the system for navigating the second aircraft 20 may not only be applied in case of a flight of the second aircraft 20. For example, it may also be applied if the second aircraft 20 is located on the runway. In this case the first aircraft, e. g. the piloted aircraft takes off and immediately sends its 4-D flight path to the second aircraft 20 such that the second aircraft 20 may follow this flight path. In other words, the first aircraft 10 determines several waypoints 40 which together define the flight path to be followed by the second aircraft 20. When the second aircraft 10 follows the first aircraft during the follow-me procedure, the time delay between first aircraft 10 and the second aircraft 20 may be permanently adjusted which means that the current speed of the second aircraft 20 may be adapted to the current speed of the first aircraft 10. However, the current speed of the first aircraft 10 may be adapted to the current speed of the second aircraft 20 and therefore to the current capabilities of the second aircraft 20. The adaption of the speed may also occur during take-off and climb phases of both aircraft 10, 20 for safety reasons. A speed information may be determined by the first aircraft 10 because each waypoint position corresponds to another time value, wherein the time value defines the point in time at which first aircraft 10 flies through the corresponding waypoint 40.

Figure 8:
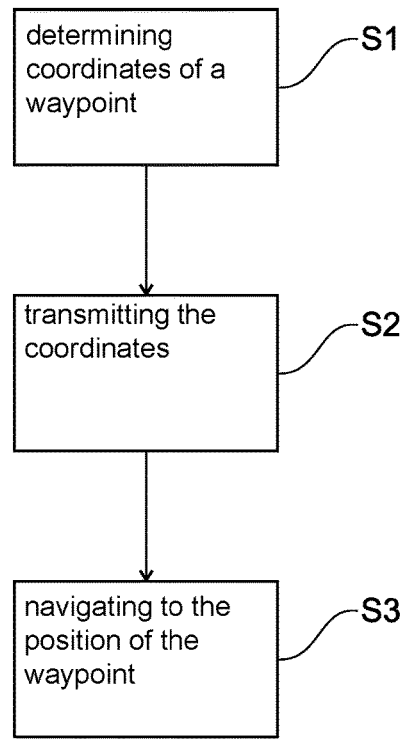
FIG. 8 shows a flow diagram for a method for navigating an aircraft according to an embodiment of the invention.

FIG. 8 shows a flow diagram for a method for navigating an aircraft. The method may comprise several steps. In a step S1 of the method, coordinates of a position of a waypoint 40 are determined by the first aircraft 10. This may include the determination of three spatial coordinates and at least one time value. In another step S2, the coordinates of the position of the waypoint 40 are transmitted from a first communication unit 12 of the first aircraft 10 to a second communication 22 unit of the second aircraft 20. In yet another step S3 of the method, the second aircraft 20 is navigated to the position of the waypoint 40. It should be mentioned that the method is not limited to the steps which are described here.

What is claimed is:

1. A system for navigating an aircraft, comprising:
a first aircraft with a first communication unit; and
a second aircraft with a second communication unit,
wherein the first aircraft is adapted to determine coordinates of a position of a waypoint,
wherein the first communication unit is adapted to transmit the coordinates of the position of the waypoint to the second communication unit, and
wherein the second aircraft is adapted to navigate to the position of the waypoint,
the first aircraft further comprising:
a first processing unit,
wherein the first processing unit is adapted to determine a position of the second aircraft based on a signal sent from the second communication unit to the first communication unit.

2. The system according to claim 1,
wherein the first aircraft is a manned aircraft.

3. The system according to claim 1,
wherein the second aircraft is an unmanned aircraft.

4. The system according to claim 1,
wherein the first aircraft is adapted to determine coordinates of positions of a plurality of waypoints, which waypoints are determined with respect to a reference system, and
wherein each of the plurality of waypoints together defines a flight trajectory of the first aircraft.

5. The system according to claim 3,
wherein the first aircraft is adapted to determine a time value for each of the plurality of waypoints.

6. The system according to claim 3,
wherein the second aircraft is adapted to follow the flight trajectory of the first aircraft during flight operation of the first aircraft and the second aircraft.

7. The system according to claim 1,
wherein the first processing unit is adapted to determine operating data of the second aircraft, which is selected from the group comprising load factor, speed and altitude.

8. The system according to claim 7, the first aircraft further comprising:
a display;
wherein the display is adapted to display at least the operating data of the second aircraft.

9. The system according to claim 1,
wherein the position of the second aircraft is determined with respect to an Earth reference system.

10. The system according to claim 1,
wherein the signal sent from the second communication unit to the first communication unit is a beacon signal, which comprises information about the identity of the second aircraft.

11. The system according to claim 1,
wherein the first communication unit comprises a radar, which is adapted to receive a beacon signal sent from the second communication unit in a passive mode such that an angular position of the second aircraft with respect to the first aircraft can be determined.

12. The system according to claim 1,
wherein the first communication unit comprises a radar, which is adapted to receive a skin echo from the second aircraft in an active mode such that a range between the first aircraft and the second aircraft can be determined.

13. A method for navigating an aircraft, comprising the steps:
determining coordinates of a position of a waypoint by a first aircraft;
transmitting the coordinates of the position of the waypoint from a first communication unit of the first aircraft to a second communication unit of a second aircraft;
navigating the second aircraft to the position of the waypoint; and
determining a position of the second aircraft based on a signal sent from the second communication unit to a first communication unit of the first aircraft.

* * * * *